United States Patent [19]

Magyar

[11] Patent Number: 5,222,757
[45] Date of Patent: Jun. 29, 1993

[54] FOLD-UP WHEELBARROW

[76] Inventor: David J. Magyar, 6524 Hamden Rd., Parma Hts., Ohio 44130

[21] Appl. No.: 758,899

[22] Filed: Sep. 11, 1991

[51] Int. Cl.⁵ .............................................. B62B 1/20
[52] U.S. Cl. ..................................... 280/653; 280/42; 280/47.18; 280/47.3
[58] Field of Search ............... 280/639, 640, 651, 652, 280/653, 654, 47.31, 47.3, 40, 42, 648, 659, 47.131, 47.17, 47.18

[56] References Cited

U.S. PATENT DOCUMENTS

| | | | |
|---|---|---|---|
| 2,471,462 | 5/1949 | Toth | 280/653 |
| 2,494,199 | 1/1950 | Provitola et al. | 280/653 |
| 2,672,348 | 3/1954 | Scott | 280/653 |
| 3,552,760 | 8/1968 | Sine | 280/653 |
| 3,826,511 | 7/1974 | Frank | 280/653 |
| 4,109,933 | 8/1978 | O'Brian et al. | 280/653 |
| 4,401,313 | 8/1983 | Filas | 280/653 |
| 4,781,396 | 11/1988 | King | 280/653 |

FOREIGN PATENT DOCUMENTS 1496968  1/1978  United Kingdom ............... 280/653

*Primary Examiner*—Richard M. Camby
*Attorney, Agent, or Firm*—Benesch, Friedlander, Coplan & Aronoff

[57] ABSTRACT

A fold-up wheelbarrow comprises a wheel and two elongate frame members connected pivotally to the wheel by hinges. A pair of legs and a flexible, load-bearing body depend from the frame members. The load-bearing body is comprised of a plurality of sheet-like panels made of a flexible material such as canvas or plastic. The wheelbarrow is held open by locking bars that help to stabilize the frame members. When the wheelbarrow is in its open position, the frame members are biased away from each other.

17 Claims, 3 Drawing Sheets

FOLD-UP WHEELBARROW

BACKGROUND OF THE INVENTION

1. Field of the Invention

The invention relates to a fold-up wheelbarrow and, more particularly, to a wheelbarrow having a load-bearing body constructed of flexible material.

2. Description of the Prior Art

Wheelbarrows have long been used as a means of transporting small loads over short distances. Loads may be characterized as pieces of stone or wood, refuse or other items suited to the basket-like arrangement of the wheelbarrow's body. Although convenient as a hauling device, the cumbersome size and shape of most standard wheelbarrows makes them difficult to store.

Many wheelbarrows have been contemplated that are functional as a hauling device, yet are easy to store. By and large, these wheelbarrows have employed the idea of compressing, folding, rotating or collapsing parts of the wheelbarrow until a more easily stored shape is achieved.

U.S. Pat. No. 4,781,396 issued Nov. 1, 1988 to King discloses a wheelbarrow that hinges the wheelbarrow's front wall and compresses the body into an easily collapsed V-shape. Since a storable shape can be achieved by folding a single front wall hinge, the King wheelbarrow represents an improvement over previous collapsible wheelbarrows. These earlier wheelbarrows often required the manipulation of a number of rods, hinges or latches to collapse the wheelbarrow into its storage shape.

Despite these advances, the King device has several drawbacks. The King device is constructed from rigid panels. It is dependent on proper manipulation of various hinges in order to achieve complete or partial closure. Such hinges can become rusted or otherwise can fail. Desirably, a wheelbarrow would be constructed that would have no hinges or other mechanical parts in its load-bearing walls.

King also does not provide for a back wall to his wheelbarrow. Such an omission makes it difficult for the user to haul loads that are subject to shifting or spillage, or that are as large as otherwise might be transported.

The King wheelbarrow employs arms that slidably attach to the axle of the wheelbarrow's wheel. Such an attachment presumably causes excessive wear of both the wheel axle and the arms. It is believed that such wear eventually can lead to failure of the wheelbarrow.

Finally, the King device permits partial closure during operation. The King device includes no means for preventing spontaneous, undesired closing. Such a drawback can present various problems during operation of the wheelbarrow.

In view of the drawbacks of the prior art, a desirable wheelbarrow would be light, easily collapsible and storable. The wheelbarrow desirably would comprise a container capable of carrying a large load without spillage. The wheelbarrow preferably could be locked in place in an open position, and would have no moving parts that could slide along the wheel axle when opened and closed, or during use. It would be constructed of light material for easy storage, yet be durable enough to withstand outdoor storage without sustaining rapid deterioration.

SUMMARY OF THE INVENTION

In response to the foregoing concerns, the present invention provides a new and improved wheelbarrow that employs a wheel, two elongate frame members that are connected pivotally to the wheel and a flexible, load-bearing body that is suspended from the frame members. The wheel includes an axle projecting from each side of the wheel. The first and second frame members each have a first and second end, the first end defining a handle and the second end being connected to one end of the axle, the first and second frame members being disposed generally parallel with each other. The first and second frame members are movable toward and away from each other by being pivoted about their second ends.

A feature of the invention is the use of a plurality of flexible, sheet-like panels to form the load-bearing body of the wheelbarrow. Preferably, the materials are made of canvas.

A second feature of the invention is one or more locking bars connected to the frame members. Preferably the locking bars are in the form of hooked latches. One end of each locking bar is rotatably connected to a given frame member, while the other end of each locking bar is releasably connected to the other frame member. When the frame members are in spread-apart, open position, the locking bars serve to maintain that position of the frame members.

A further feature of the invention is a biasing means included as part of the frame members. Preferably, the biasing means is in the form of an elastomeric compressible member that surrounds each frame member. When the frame members are opened, the compressible members can be disposed between the wheel axle and the frame members. Thereafter, when the frame members are moved toward each other for purposes of engaging the locking bars, the compressible members are compressed. The compression created by the partial closure of the frame members insures a secure engagement of the locking bars and the frame members. When closing the wheelbarrow, the locking bars are disengaged and the compressible members are moved away from the wheel axle in order to permit the frame members to be pivoted toward each other.

The foregoing and other features and advantages of the invention are illustrated in the accompanying drawings and are described in more detail in the specification and claims that follow.

BRIEF DESCRIPTION OF THE DRAWINGS

FIG. 2A is an enlarged, fragmentary, perspective view of an alternative form of locking bar used to hold the wheelbarrow of FIG. 1 in a locked, open position.

DESCRIPTION OF THE PREFERRED EMBODIMENT

Figure 1:
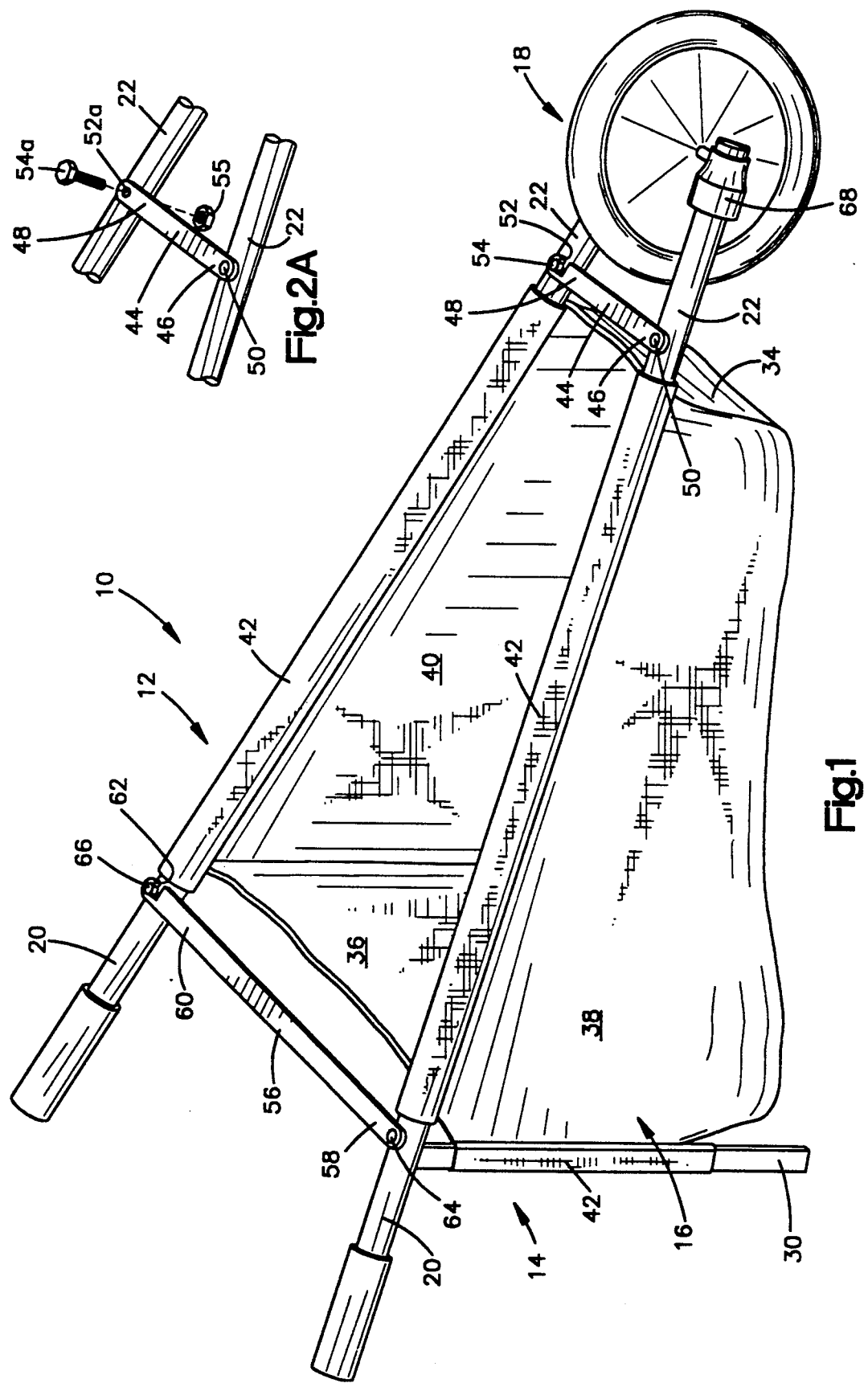
FIG. 1 is a perspective view of a wheelbarrow according to the invention in an open position.
Figure 2:
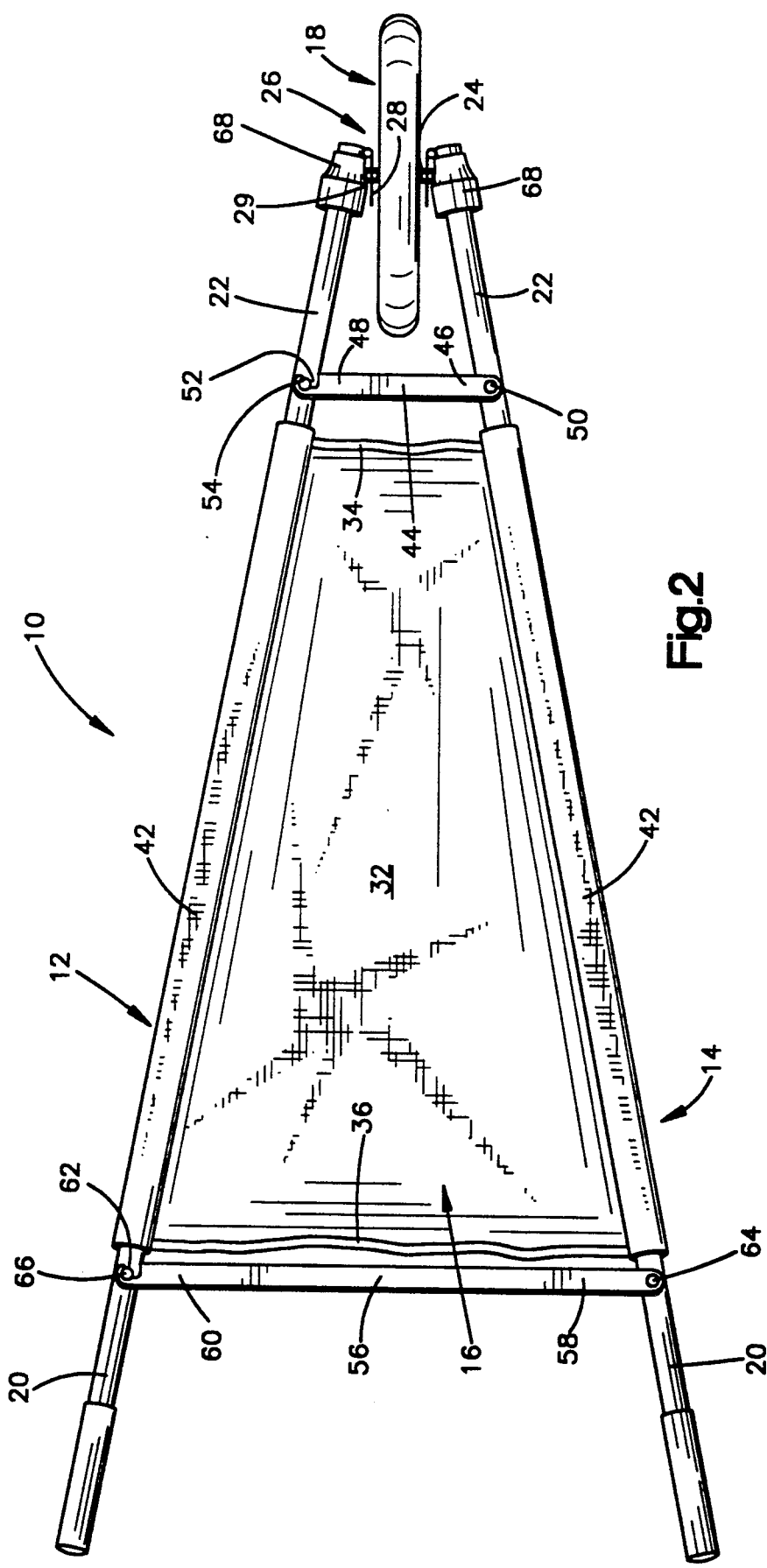
FIG. 2 is a top plan view of the wheelbarrow of FIG. 1, showing locking bars and biasing means in a locked, open position.
Figure 3:
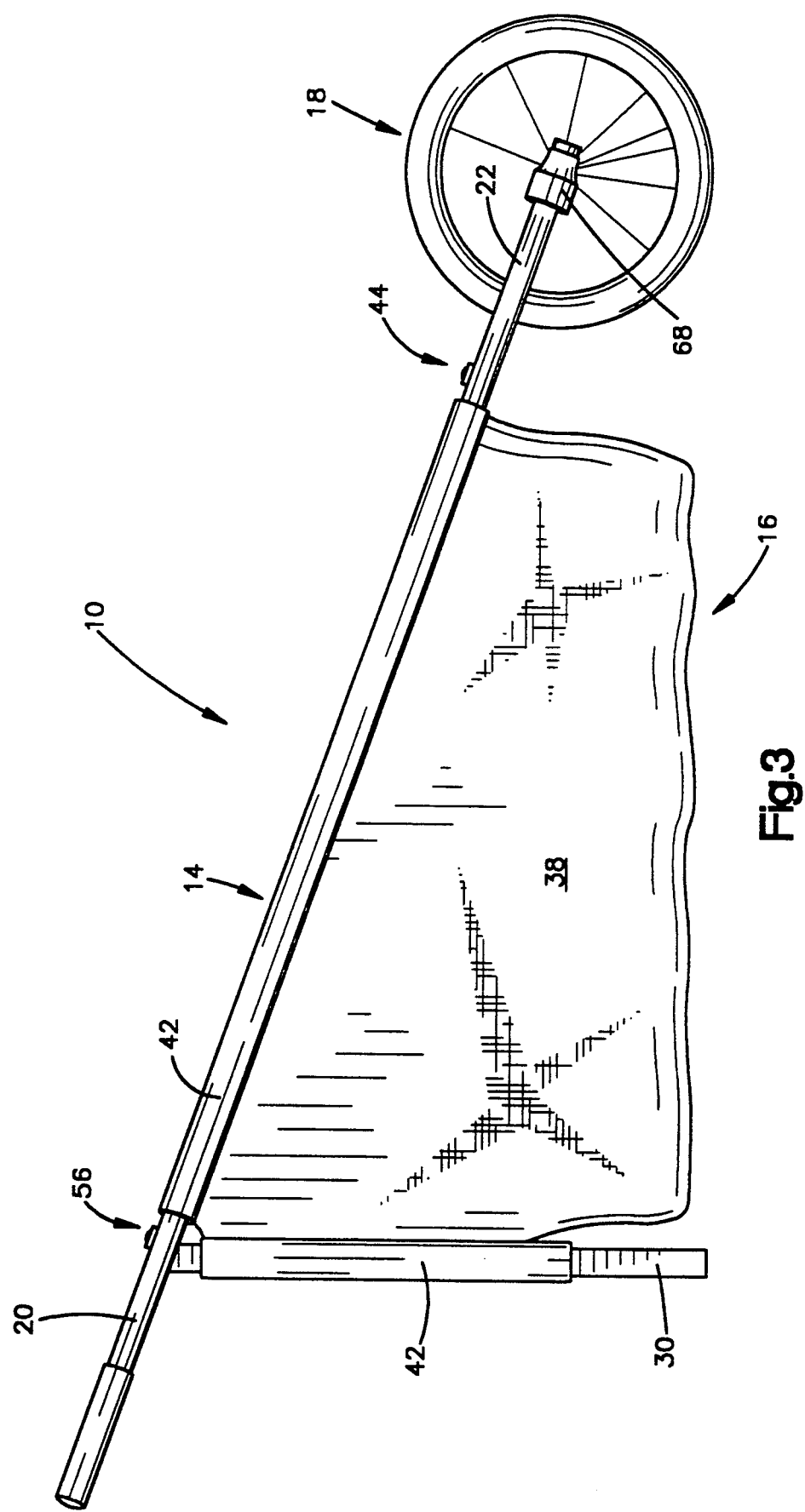
FIG. 3 is a side elevational view of the wheelbarrow of FIG. 1, showing the attachment of a flexible, load-bearing body to elongate frame members.

Referring to FIGS. 1-3, a fold-up wheelbarrow is indicated generally by the reference numeral 10. The wheelbarrow 10 includes two elongate frame members 12, 14, a flexible, load-bearing body 16 and a wheel 18. The frame members 12, 14 preferably are made of wood, but alternative embodiments using heavy PVC tubing or pipe are contemplated, as well. Each frame member 12, 14 has a first end 20 in the form of a handle, and a second end 22.

As shown in FIGS. 1 and 2, the wheel 18 includes an axle 24. The frame members 12, 14 are connected to the axle 20 by hinges 26. Each hinge 26 include a first leaf 28 that is connected to the axle 24 and a second leaf 29 that is connected to the second end 22. The frame members 12, 14 are disposed generally parallel with each other. Legs 30 are connected to the frame members 12, 14. The legs 30 are illustrated schematically for purposes of clarity of illustration. It is to be understood that in practice, the legs 30 will be braced relative to the frame members 12, 14 and possibly to each other as well.

The body 16 is connected to the frame members 12, 14 and is suspended therefrom. The body 16 comprises a plurality of sheet-like panels 32, 34, 36, 38, and 40 that are connected at their edges. The body 16 may be constructed of nylon, reinforced plastic or canvas, but canvas is the preferred material. The attachment between the body 16 and the frame members 12, 14 is made by an elongate hollow roll 42 through which the frame members 12, 14 extend. A similar connection is made between the body 16 and the legs 30.

The wheelbarrow 10 includes a means for locking the first and second frame members 12, 14 in a fixed, open position. The means for locking the first and second frame members 12, 14 in a fixed, open position includes a first bar 44 having first and second ends 46, 48. The first bar 44 is located between the wheel 18 and the forwardmost panel 34. The first bar 44 is pivotally connected to a selected frame member 12, 14 (the member 14 is illustrated) by means of a lag bolt 50. The second end 48 includes a hooked opening 52 that can be secured to a lag bolt 54 that projects from the upper surface of the frame member 12.

A second bar 56 extends between, and is connected to, the frame members 12, 14 in a substantially similar manner to the first bar 44. The second bar 56 includes first and second ends 58, 60 and a hooked opening 62. Lag bolts 64, 66, substantially similar to lag bolts 50, 54, are attached to the frame members 12, 14. The second bar 56 is located adjacent the first ends 20 at a location near the rearwardmost panel 34.

If desired, the hooked openings 52, 62 could be eliminated and replaced by a through opening 52a adjacent the first ends 46, 58. If such a construction should be utilized, the lag bolts 54, 66 should be replaced by threaded studs (54a) that can extend through the openings formed in the first ends 46, 58. If such a construction is utilized, nuts (55) can be threaded onto the studs in order to hold the bars 44, 56 in place.

In the preferred embodiment of the invention as illustrated in FIGS. 1-3, the wheelbarrow 10 includes a means for biasing the frame members 12, 14 apart during use. The means for biasing the frame members 12, 14 apart is in the form of compressible, elastomeric members 68 that are fitted about the frame members 12, 14 adjacent the second ends 22. The compressible members 68 are fitted loosely enough about the frame members 12, 14 that they can be moved back and forth along the frame members 12, 14 in the region of the second ends 22.

OPERATION

In operation, the wheelbarrow 10 is opened by pulling the frame members 12, 14 apart. The compressible members 68 are moved to that position shown in FIGS. 1-3. Thereafter, upon moving the frame members 12, 14 toward each other, the compressible members 68 will be compressed in place between the first and second leaves 28, 29 of the hinges 26. Such compression of the compressible members 68 will tend to bias the frame members 12, 14 apart.

After the frame members 12, 14 have been biased apart in the manner described, the locking bars 44, 56 are moved to that position shown in FIGS. 1 and 2 such that the hooked openings 52, 62 engage the lag bolts 54, 66. Under the tension provided by the compressible members 68, the connection between the hooked openings 52, 62 and the lag bolts 54, 66 will be maintained. The connection that has been established between the frame members 12, 14 not only will serve to lock the frame members 12, 14 in an open position, but it will also serve to rigidify the wheelbarrow 10.

If the alternative form of the locking bars 44, 56 are utilized, it is not necessary to employ the compressible members 68 because the bars 44, 56 will be rigidly secured to the frame member 12 due to the interaction of the threaded studs and the nuts that are threaded thereto. Even without the compressible members 68, the secure connection between the bars 44, 56 and the frame member 12 provided by the studs and nuts will rigidify the wheelbarrow 10.

In order to fold-up the wheelbarrow 10 for the purposes of storage or shipment, the foregoing procedure should be reversed. That is, it is necessary only to disconnect the bars 44, 56 from the frame member 12. The bars 44, 56 then can be pivoted to a position parallel with the frame member 14. After the bars 44, 56 have been disconnected and pivoted as described, the frame members 12, 14 can be moved slightly apart as so as to permit the compressible members 68 to be moved from between the leaves 28, 29 of the hinges 26. Movement of the compressible members 68 will permit the frame members 12, 14 to be pivoted toward each other until they are adjacent each other. Due to the flexible nature of the body 16, opening and closing of the frame members 12, 14 is permitted easily.

A number of advantages are realized by the wheelbarrow 10. As suggested, the wheelbarrow 10 can be folded up easily due to the flexible nature of the sheet-like panels comprising the body 16. There are no hinged sections that must be manipulated in order to fold or unfold the wheelbarrow 10. By using canvas or a similar flexible material for the body 16, the wheelbarrow 10 is lightweight and easy to store. A cloth or plastic body construction is not as susceptible to oxidation as a metal wheelbarrow, so the wheelbarrow 10 should be at least as durable as a metal wheelbarrow. Also, the wheelbarrow 10 will be able to carry a variety of loads without spillage as a result of a tendency of the panels 32, 34, 36, 38, 40 to envelope the loads when they are placed in the body 16. The low cost of canvas or plastic, as compared to most metals, decreases the cost of manufacture of the invention as well.

The locking bars 44, 56 that are used to hold the frame members 12, 14 in an open position are very strong and readily prevent unintended closure of the frame members 12, 14. Moreover, it is very easy to disengage the locking bars 44, 56 from the frame member 12 when it is desired to fold-up the wheelbarrow 10. The compressible members 68 serve to protect the hinges 26. The hinges 26 themselves avoid a sliding attachment of the mating components of the wheel 18 and the frame members 12, 14 and, as a result, eliminate breakdowns that otherwise might result from the frame members 12, 14 sliding back and forth over the wheel axle 24.

Although the invention has been described in its preferred form with a certain degree of particularity, it will be understood that the present disclosure of the preferred embodiment has been made only by way of example and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. A wheelbarrow, comprising:
   a wheel having an axle projecting from each side of the wheel;
   a first elongate frame member having first and second ends, the first end defining a handle and the second end being connected to one end of the axle;
   a second elongate frame member having first and second ends, the first end defining a handle and the second end being connected to the other end of the axle, the first and second frame members being disposed generally parallel with each other;
   the first and second frame members being movable toward and away from each other by being pivoted about their second ends;
   a flexible, load-bearing body connected to each of the frame members and suspended therefrom;
   means for locking the first and second frame members in a fixed, open position; and
   means for biasing the first and second frame members away from each other when the frame members are in the fixed, open position, said means for biasing comprises compressible members disposed intermediate the second ends of the frame members and the axle, the compressible members being compressed upon actuation of the means for locking the first and second members in a fixed, open position.

2. The wheelbarrow of claim 1, wherein the second ends of the first and second frame members are connected to the axle by a hinged connection.

3. The wheelbarrow of claim 2, wherein the hinged connection comprises first and second leaves, the first leaf being connected to the axle and the second leaf being connected to the frame member.

4. The wheelbarrow of claim 1, wherein the means for locking is in the form of a first bar having first and second ends, the bar being pivotally connected at the first end to a selected one of the first frame member or the second frame member and releasably connected at the second end to the other of the first frame member or the second frame member.

5. The wheelbarrow of claim 4, further comprising a second bar having first and second ends, the second bar being pivotally connected at the front end to a selected one of the first frame member or the second frame member and releasably connected at the second end to the other of the first frame member or the second frame member, the first and second bars being spaced from each other along the length of the first and second frame members.

6. The wheelbarrow of claim 4, wherein the releasable connection between the first bar and the frame member is in the form of a threaded stud projecting from the frame member, an opening in the bar, the stud extending through the opening, and a nut threadedly engaged with the stud.

7. The wheelbarrow of claim 4, wherein the releasable connection between the first bar and the frame member is in the form of a lag bolt projecting from the frame member, and a hooked opening formed at the end of the bar, the hooked opening adapted to engage the lag bolt.

8. The wheelbarrow of claim 1, wherein the compressible members are disposed about the frame members and are movable along the frame members between an axle-engaging position and a non-axle-engaging position.

9. The wheelbarrow of claim 1, wherein the compressible members are made of an elastomeric material.

10. The wheelbarrow of claim 1, further comprising legs connected to the frame members and extending downwardly therefrom.

11. The wheelbarrow of claim 1, wherein the load-bearing body includes a plurality of sheet-like panels connected at their edges.

12. The wheelbarrow of claim 1, wherein the load-bearing body is made of a material selected from the group consisting of nylon, reinforced plastic, and canvas.

13. A wheelbarrow, comprising:
   a wheel having an axle projecting from each side of the wheel;
   a first elongate frame member having first and second ends, the first end defining a handle, and the second end being connected to one end of the axle by a hinged connection;
   a second elongate frame member having first and second ends, the first end defining a handle and the second end being connected to the other end of the axle by hinged connection;
   the first and second frame members being disposed generally parallel with each other and being movable toward and away from each other by being pivoted about their second ends;
   means for locking the first and second frame members in a fixed, open position, the means for locking being in the form of a first bar having first and second ends, the bar being pivotally connected at the first end to a selected one of the first frame member or the second frame member and releasably connected at the second end to the other of the first frame member or the second frame member;
   means for biasing the first and second frame members away from each other when the frame members are in the fixed, open position, the means for biasing being in the form of compressible members disposed intermediate the second ends of the frame members and the axle, the compressible members being compressed upon actuation of the means for locking the first and second frame members in a fixed, open position;
   the compressible members being disposed about the frame members and movable along the frame members between an axle-engaging position and a non-axle-engaging position;
   a flexible, load-bearing body connected to each of the frame members and suspended therefrom, the load-bearing body including a plurality of sheet-like panels connected at their edges; and legs connected to the frame members and extending downwardly therefrom.

14. The wheelbarrow of claim 13, further comprising a second bar having first and second ends, the second bar being pivotally connected at the first end to a selected one of the first frame member or the second frame member and releasably connected at the second end to the other of the first frame member or the second frame member, the first and second bars being spaced from each other along the length of the first and second frame members.

15. The wheelbarrow of claim 13, wherein the releasable connection between the first bar and the frame member is in the form of a threaded stud projecting from the frame member, an opening in the bar, the stud extending through the opening and a nut threadedly engaged with the stud.

16. The wheelbarrow of claim 13, wherein the releasable connection between the first bar and the frame member is in the form of a lag bolt projecting from the frame member, and a hooked opening formed at the end of the bar, the hooked opening adapted to engage the lag bolt.

17. The wheelbarrow of claim 13, wherein the load-bearing body is made of a material selected from the group consisting of nylon, reinforced plastic, and canvas.

* * * * *